United States Patent [19]
Tognazzini

[11] Patent Number: 5,850,211
[45] Date of Patent: Dec. 15, 1998

[54] EYETRACK-DRIVEN SCROLLING

[75] Inventor: Bruce Tognazzini, Woodside, Calif.

[73] Assignee: Sun Microsystems, Inc., Palo Alto, Calif.

[21] Appl. No.: 670,907

[22] Filed: Jun. 26, 1996

[51] Int. Cl.$^6$ .............................. G09G 5/08; G09G 5/34
[52] U.S. Cl. .......................................... 345/158; 345/123
[58] Field of Search .................................. 345/123–125, 345/158, 973, 974

[56] References Cited

U.S. PATENT DOCUMENTS 4,513,317  4/1985  Ruoff, Jr. ................................. 348/384
5,367,315  11/1994  Pan ......................................... 345/156

OTHER PUBLICATIONS

Arne John Glenstrup, Theo Engelll–Nielsen, Eye Controlled Media: Present and Future State, Jun. 1, 1995, pp. 1–5.
Jacob Nielsen, Noncommand User Interfaces, Communications of the ACM, Apr. 1993/vol. 36 No. 4, pp. 83–99.
Dixon Cleveland and Nancy Cleveland, Eyegaze Eyetracking System, Jan. 29–31, 1992.
Fourward Eyetracker, SRI Homepage at http://www.sri.com, Apr. 30, 1996.

Primary Examiner—Jeffery Brier
Attorney, Agent, or Firm—McDermott, Will & Emery

[57] ABSTRACT

Scrolling of page oriented or continuous information is initiated or controlled based on where a viewer's eyes are looking as detected by an eyetracker. Scrolling rate can be gradually changed based on how far down a screen of text a reader has read, so that a reader will not run out of text. Selection of objects to scroll is also accomplished using the eyetracker. Page and scroll objects can be defined on the display and activated by a user's gaze. A change of background color may be used to make a user aware that a page change is imminent.

16 Claims, 12 Drawing Sheets

EYETRACK-DRIVEN SCROLLING

BACKGROUND OF THE INVENTION

1. Field of the Invention

The invention relates to computer systems and more particularly to computer systems having an eyetracker which is utilized to control scrolling.

2. Description of Related Art

Computer systems are known in the art which utilize a plurality of windows, each window containing text or graphical information. Often, text or graphical information exceeds the size of the window available for viewing it. Under such circumstances, scrolling is required, that is, moving the information with respect to the window so that the desired portion of text or graphical material is visible to the user through the window. Commonly, this is done by manipulating an indicator along a scroll bar in a way which indicates the approximate percentage of displacement in one dimension of the material being viewed. This is typically a complex activity on the part of the user. It requires locating a pointing device or scrolling key, and operating the device or key to move the contents up or down. This activity takes times and cause certain level of cognitive disengagement. That is, the user's attention must be distracted from the substantive content of the window to undertake the scrolling activity. When the user's attention returns to the content of the window, the user can hopefully recall thought processes in effect at the time that scrolling became necessary.

Eyetracking devices are known particularly in conjunction with heads up displays in certain control applications in aircraft. An eyetracker device monitors the eyes of a user and calculates the direction in which the user is looking and, in some applications, the particular point in three dimensional space on which the user's eyes focus.

One commercial eyetracker is the Dual-Purkinje-Image (DPI) Eyetracker, manufactured by Forward Optical Technologies, Inc. of El Chaon, Calif. It determines the direction of gaze over a large two dimensional visual field with great accuracy and without any attachments to the eye. It operates with infra-red light which is invisible to the subject and does not interfere with normal vision. The eyetracker has a pointing accuracy on the order of one minute of arc and response time on the order of one millisecond. One can utilize the DPI Eyetracker with an infra-red optometer to allow a continuous measure of eye focus, producing a three dimensional eyetracker.

Object oriented programming is a known form of software development that models the real world representation of objects or modules that contain data as well as instructions that work upon that data. Objects are the basic building blocks of an object oriented program. Objects are software entities. They may model something physical like a person or they may model something virtual like checking account. Normally an object has one or more attributes (fields) that collectively define the state of the object; behavior defined by a set of methods (procedures) that can modify those attributes; and an identity that distinguishes it from other objects. Encapsulation refers to the hiding of most of the details of the object. This permits the object to be treated as a single entity. However, the set of operations associated with the object are explicit and constitute a well defined interface. One object requests another object to perform one or more operations through messaging. An object is sometimes referred to as an instance of an abstract data type or class. The programmer may define a class of objects by describing the attributes and procedures common to the class. By defining the class only once, a plurality of instances can be created by associating the class attributes and procedures with each instance and allowing the instances to differ only in their identity or in a particular value associated with the range of values permitted for the class.

Object oriented programming also permits creation of subclasses in which class attributes and procedures can be inherited from the class by subordinate subclasses and creation of super classes in which only the common attributes and procedures of a group of instances of various classes are retained as the defining characteristics.

SUMMARY OF THE INVENTION

The present invention provides apparatus, systems, processes and computer program products which permit the user to control scrolling without any overt action of the type required in the prior art, such as manipulating scroll bars to change the view displayed to the user. This is accomplished by integrating an eyetracker with a computer in such a way that when the eye approaches certain points within the window, scrolling is automatically activated so that the portion of text or graphical material viewed is that which follows the interest and attention of the user, generally with no overt action required by the user.

The invention is directed to apparatus for controlling information on a display, including a computer, a display connected to the computer, an eyetracker connected to the computer for detecting a location on the display at which a user's eyes are looking, and a controller to change the information content on the display as a function of the location. One type of change the controller makes to the information content includes scrolling at a rate which is a function of the relationship between the location to which the user's eyes are directed and a reference position. The function can be a linear function, an exponential function and a discontinuous function. If a discontinuous function is used, the transitions between regions of the discontinuous function are smoothed so that changes in rate of scrolling occur without substantial distraction to the user.

Another type of change includes paging. Paging is initiated by a user looking at a particular area of the screen for a particular duration. Scrolling within a page is accomplished by looking at a different area of the screen for a particular duration. The areas of the screen can be marked by display of an icon.

The invention is also directed to a method for controlling information on a display of a computer having an eyetracker, by identifying a location on the display to which a user's eyes are directed, and changing the information content on the display as a function of that location.

The invention is also directed to a method for controlling information on a display of a computer having an eyetracker, by identifying a location on the display to which a user's eyes are directed, and selecting and deselecting a text object based on the location.

The invention is also directed to a method for controlling information on a display of a computer having an eyetracker, by identifying a location on the display to which a user's eyes are directed, and changing a display color as the user's eye's approach a page boundary.

The invention is also directed to a system for displaying information, comprising a network, and a plurality of computers connected to the network, at least one of the computers having an eyetracker and configured for detecting a location on a display at which a user's eyes are looking and for changing the information content on the display as a function of the location.

The invention is also directed to computer program products for carrying out the techniques of the invention.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
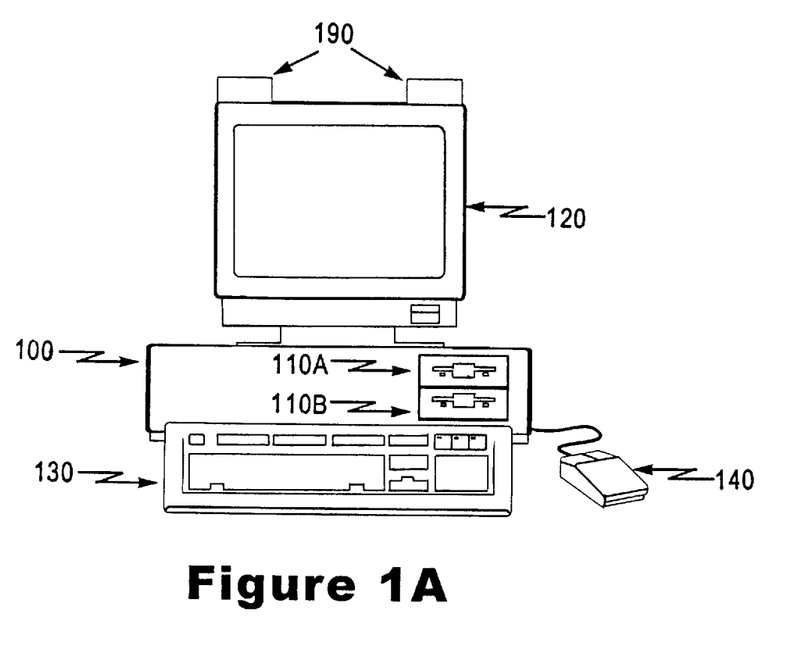
FIG. 1A illustrates a computer, equipped with an eyetracker, of a type suitable for carrying out the invention.
Figure 1B:
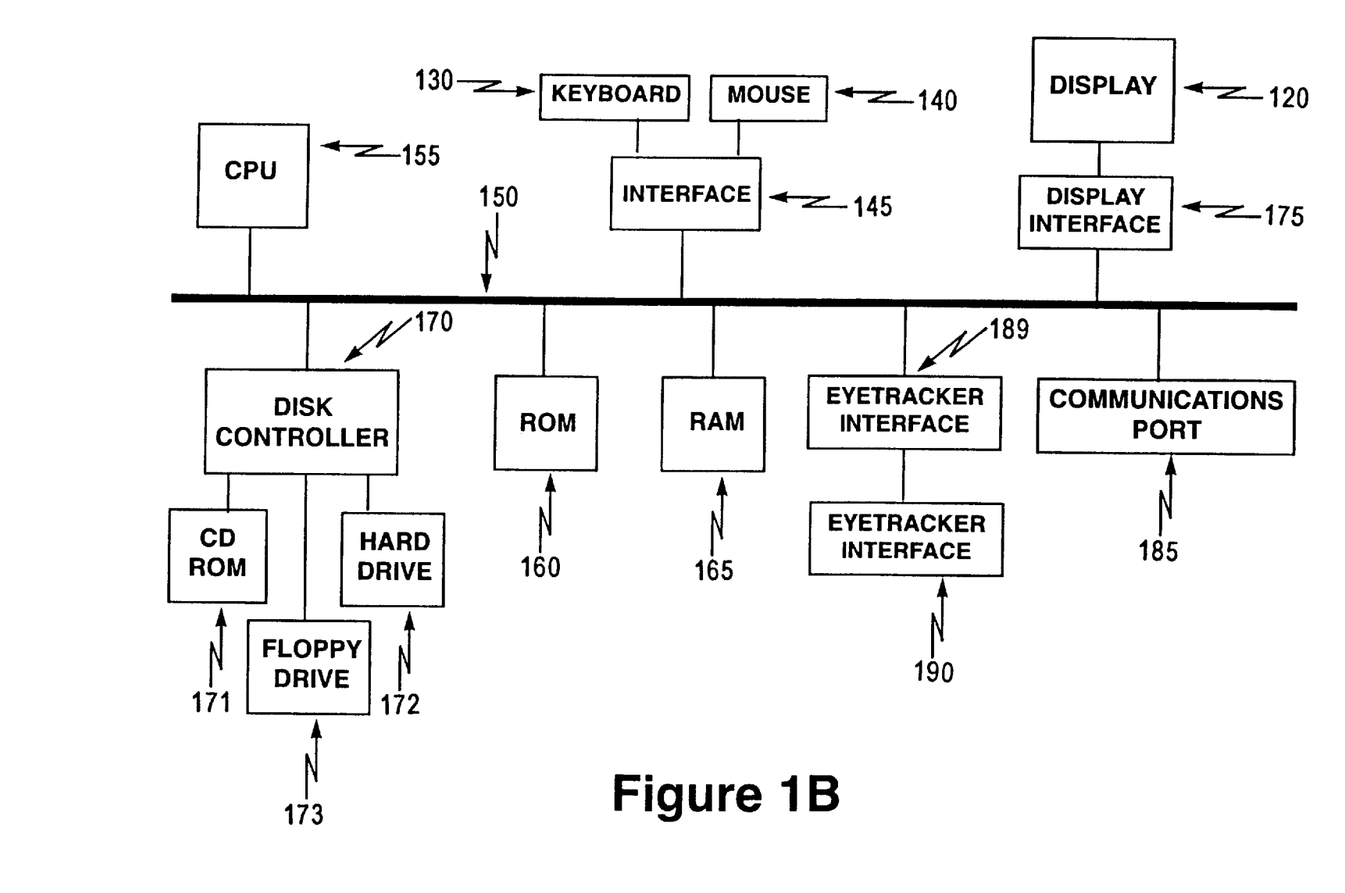
FIG. 1B illustrates a block diagram of the computer of FIG. 1A.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices over interface 145 (FIG. 1B). One or more camera and illumination parts 190, shown mounted on the display casing, are used to observe the user's eyes and determine the position at which a user's eyes are looking. Preferably, the computer illustrated in FIG. 1A is a SPARC workstation from Sun Microsystems, Inc.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute a program. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a high resolution display 120 and permits information from the bus to be displayed on the display. An eyetracker 190 is connected to the bus on eyetracker interface 189. It locates the position at which a user's eyes are looking. Many of the control functions described herein are activated based upon where a user is looking. Communications with external devices can occur over communications port 185.

Figure 1C:
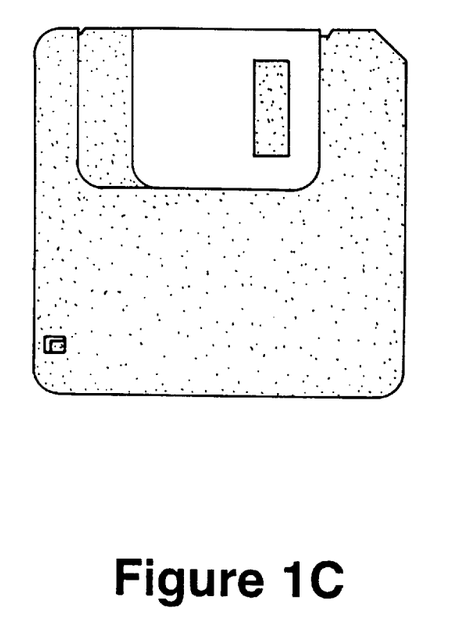
FIG. 1C illustrates an exemplary memory medium containing a program usable with the computer of FIG. 1A.

FIG 1C illustrates an exemplary memory medium which can be used with drives such as 173 in FIG. 1B or 110A in FIG. 1A. Typically, memory media such as a floppy disk, a CD ROM, or a Digital Video Disk will contain the program information for controlling the computer to enable the computer to perform its testing and development functions in accordance with the invention.

Figure 2:
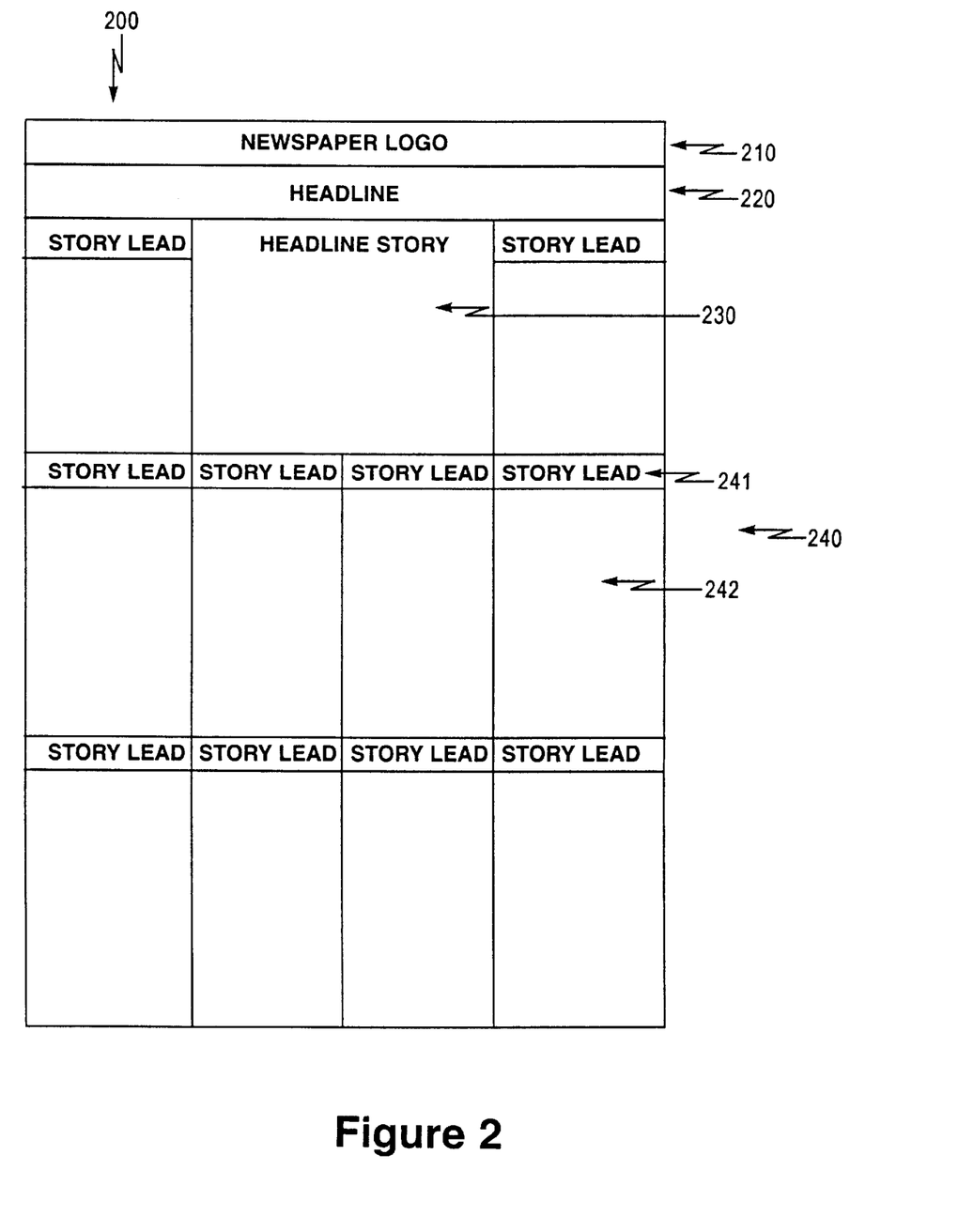
FIG. 2 is a view of an electronic newspaper constructed of various text objects.

FIG. 2 shows a newspaper object 200 such as might be found in an electronic newspaper publication. A newspaper consists of newspaper logo 210, headline 220 and headline story 230. In addition, a plurality of story text objects 240 are shown, each comprised of a story lead or a headline for that particular story 241, and the text of the story 242. The newspaper shown is comprised of a plurality of such text objects, optionally organized in pages.

Figure 3:
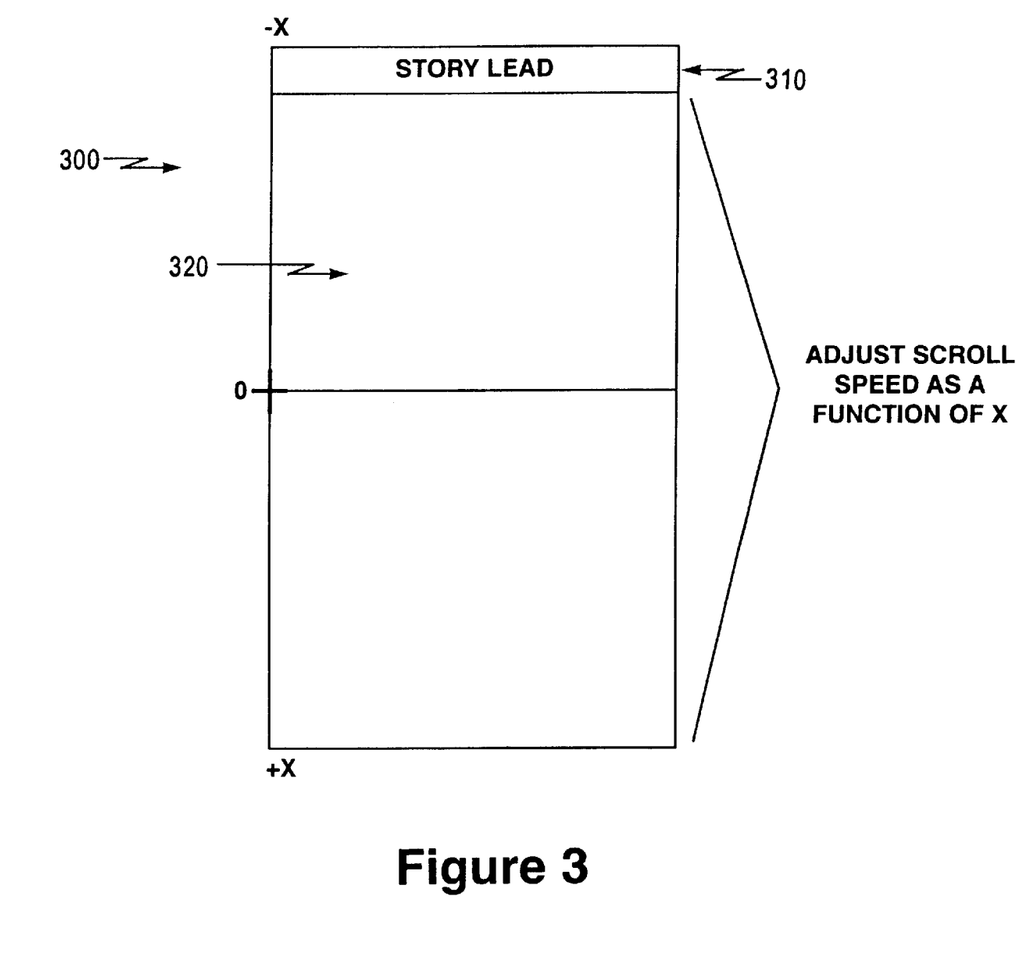
FIG. 3 is a representation of an exemplary text object.

FIG. 3 is a representation of an exemplary text object. The story lead object 310 and the text of the story 320 comprise the text object. The text object is stored within a window indicated by the outer boundary of the text object shown in FIG. 3. A reference position indicated by the horizontal line, originating at the origin of the coordinate system O, extends across the text object. In reality, this reference position would not be visible to the reader of the story, but rather represents an invisible control line. When the text of the text object is first displayed within the object window, the start of the text is positioned immediately under the story lead in the usual fashion. As a user's eyes begin to read the text of the story, the eyes move down toward the reference line O. Because of the format of an electronic newspaper, the windows for displaying stories are relatively small and therefore the text can not all be displayed, normally, within the window. As a result, when the user's eyes approach the reference line, the text of the text object begins to scroll within the window so that a supply of unread text is always present. As illustrated in FIG. 3, the scroll speed is adjusted as a function of the position X (in the illustration shown X is an indication of the number of lines up or down from the reference line). The scroll speed is adjusted as a function of that position X.

A particular function of X utilized the scroll speed may be any of the following:

$$F = KX \quad (1)$$

$$F = KX^2 \quad (2)$$

$$F3 = \begin{matrix} 0, & X = -9 \text{ to top} \\ N, & X = 0 \text{ to } -8 \\ M, & X = 0 \text{ to } +8 \\ 2M, & X = 9 \text{ to bottom} \end{matrix} \quad (3)$$

Of course, a number of other functions may be utilized but these are preferred. In equation (1) above, the scrolling speed is linear. That is the speed at which the text scrolls is a function of how far above the reference line or below the reference line the user's eyes appear to be gazing. If the user's eyes are above the line (reference line), the scrolling speed will slow until the user's eyes reach the reference line. The rate of scrolling will begin to speed up as the user's eyes drop below the reference line so that the user's eyes never reach the bottom of the viewing window.

Equation (2) shows a non-linear function. With this function, as a user's eyes are displaced from the reference line, the rate of scrolling increases or decreases exponentially.

Equation (3) reflects the partitioning of the viewing window into regions, with a particular scrolling speed associated with each region.

It is important, to the user's ability to read, that any change in scrolling speed occur gradually. Thus, even in the situation where a scrolling boundary is crossed abruptly, such as occurs in conjunction with the equation (3), the transition from the old value of scrolling speed to the new value of scrolling speed would occur very gradually so as not to disrupt the user's reading.

A desire not to disrupt a user's reading is also the genesis of the requirement for a high resolution display. In low resolution displays, scrolling would appear to be somewhat jerky compared with the smoothness achievable with a high resolution display. That is, as the image of a line of characters is displaced up in the viewing window, low resolution displays would require a substantial jump between lines of pixels for each movement of the line of characters. A jumpiness up of such a display would be distracting to the reader. However, the jumpiness could be minimized and reduced to the point of insignificance by utilizing a high resolution display.

Figure 4:
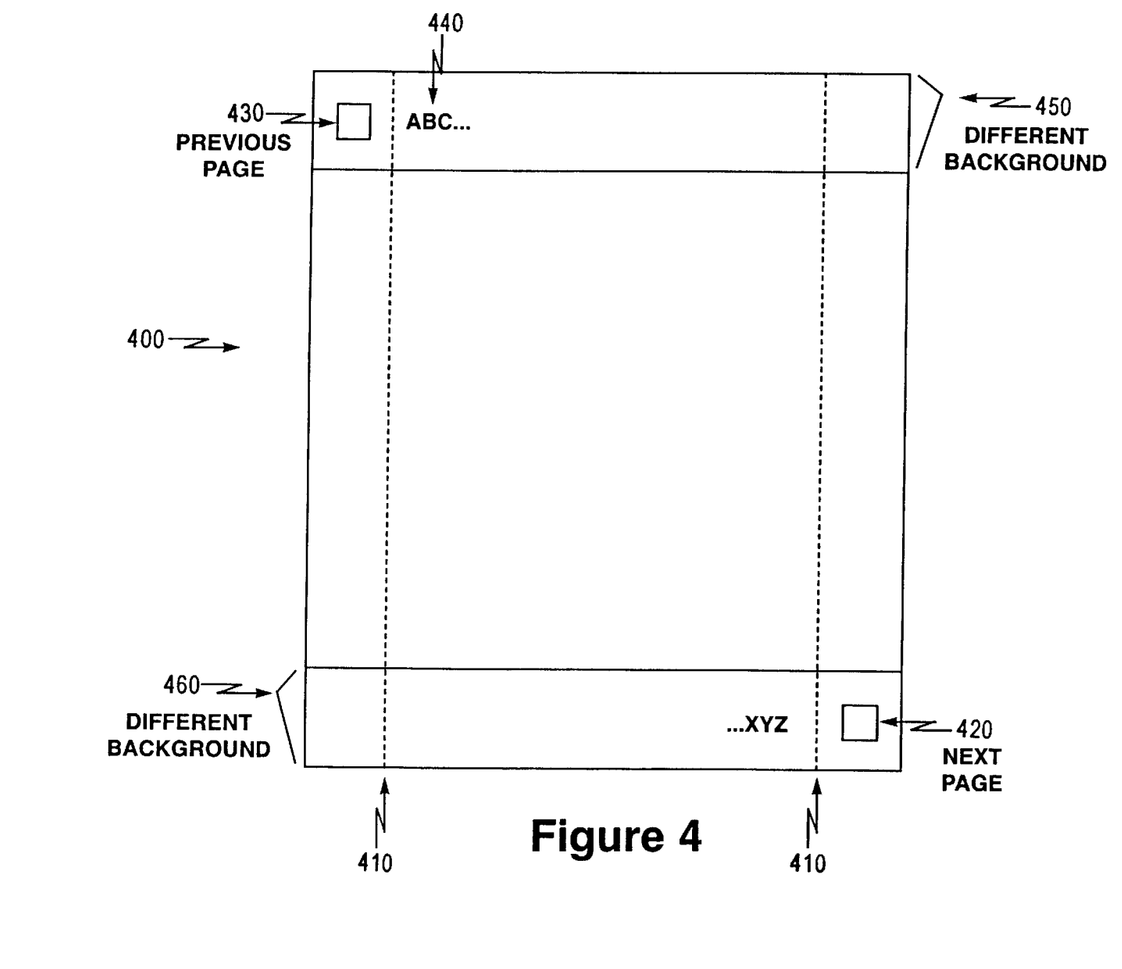
FIG. 4 is a representation of a page layout incorporating page change information with previous page and next page control areas.

FIG. 4 is a representation of a page layout incorporating page change information with previous page and next page control areas. FIG. 4 shows a text page such as used in certain page oriented text editors. The page 400 has margin boundaries 410 shown as vertical dashed lines with the start of text centered at 440 and the bottom of the text shown at the bottom page. A next page area 420 and a previous page area 430 are explicitly identified and utilized, in conjunction with the eyetracker, to trigger the display of the next page or the previous page of text information. As the user's eyes move down the page, the user will approach the bottom of the text. To prepare the user for the fact that a page boundary is nearby and that the user may expect a page change, a different background color is shown in the region 460. This permits the user to visibly notice that he is nearing the end of the text for this page. As the user reads the last line of text, symbolized by XYZ at the bottom of the window, a user's eyes will naturally continue in the direction of motion onto the area 420 which will be detected and utilized to retrieve and display in the viewing window the next page of text. Similarly, when the viewer is on a second or subsequent page, and is looking back in the text for a particular reference, the user's eyes will proceed upward on the screen until the top line of text shown at ABC. If the user has not found the material for which he is looking and wishes to go back yet another page, his eyes need merely look at the closely adjacent area 430 for a brief interval which is interpreted as a page up request and the text from the previous page is substituted in the viewing window.

Figure 5:
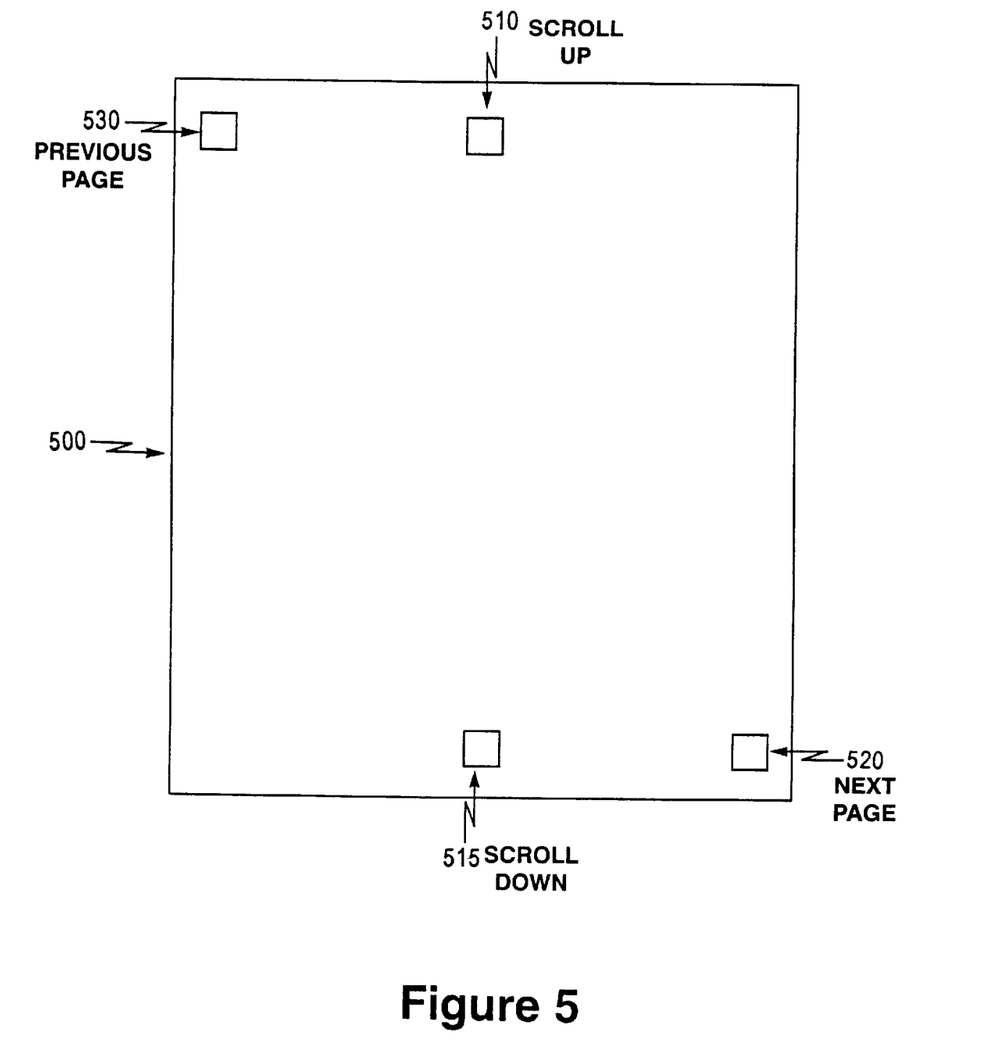
FIG. 5 is a representation of a page layout incorporating scroll objects and page change objects.

FIG. 5 is a representation of a page layout incorporating scroll objects and page change objects. The arrangement shown in FIG. 5 is preferably used where the viewing window can only display less than one page of information. As shown in FIG. 5, the text object 500 includes a scroll up area 510, a scroll down area 515, a next page area 520, and a previous page area 530. The scroll areas 510 and 515 are associated with the viewing window and will not normally move. The scroll up area 510 is not active when the text display is at the top of the page and the scroll down area 515 is not active when the text displayed is already at the bottom of the page. Changing pages requires looking at page change areas 520 and 530 as discussed above. Scrolling within the page, however, is controlled by the scroll up, scroll down areas 510 and 515.

Any of the scroll areas described herein may be visible or invisible areas. Visible areas are in some senses preferred because the user may choose to activate the function consciously. However, if they are invisible, the areas are positioned at locations which the user's eyes would normally traverse in the course of reading in order to invoke the function desired.

Figure 6:
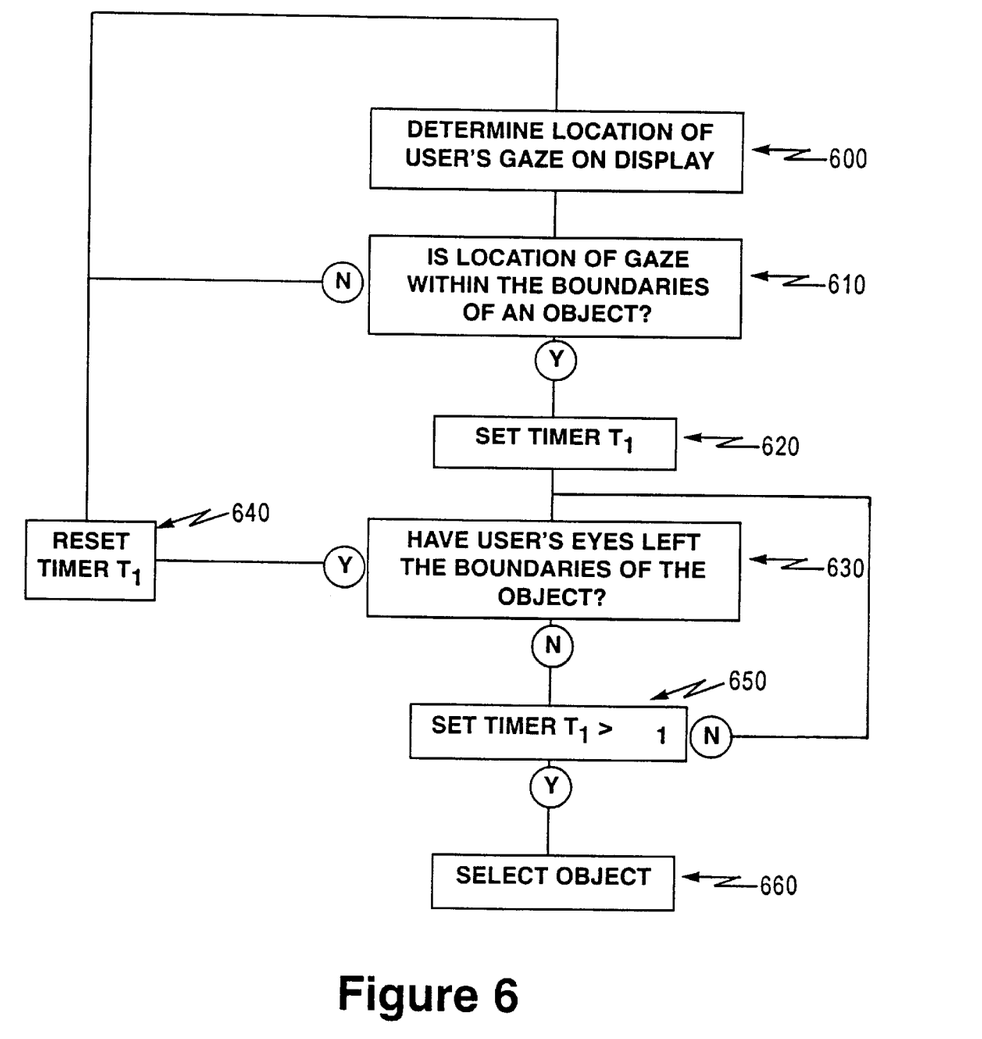
FIG. 6 is a flow chart of a select object process.

FIG. 6 is a flow chart of a select object process. The process illustrated can be used, for example, in selecting a text object from a plurality of objects, such as the text objects shown in FIG. 2 as part of an electronic newspaper. The eyetracker determines the location of the user's gaze on the display 600 and determines whether or not the location of that gaze is within the boundaries of a text object. If it is within the boundaries of an object, a timer T1 is set (620) and the position of the user's gaze is checked to see if the user's eyes have left the boundaries of the object (630). If they have, timer T2 is reset (640) and the process begins from block 600 once again. If they have not, a check is made to see if timer T1 exceeds the value $T_1$. If the timer has not exceeded $T_1$, (650-N) the process will continue to check that the location of the user's eyes remain within the boundaries of the object (630). Otherwise, once the timer exceeds the value of $T_1$, the object is selected (660) for viewing.

Figure 7:
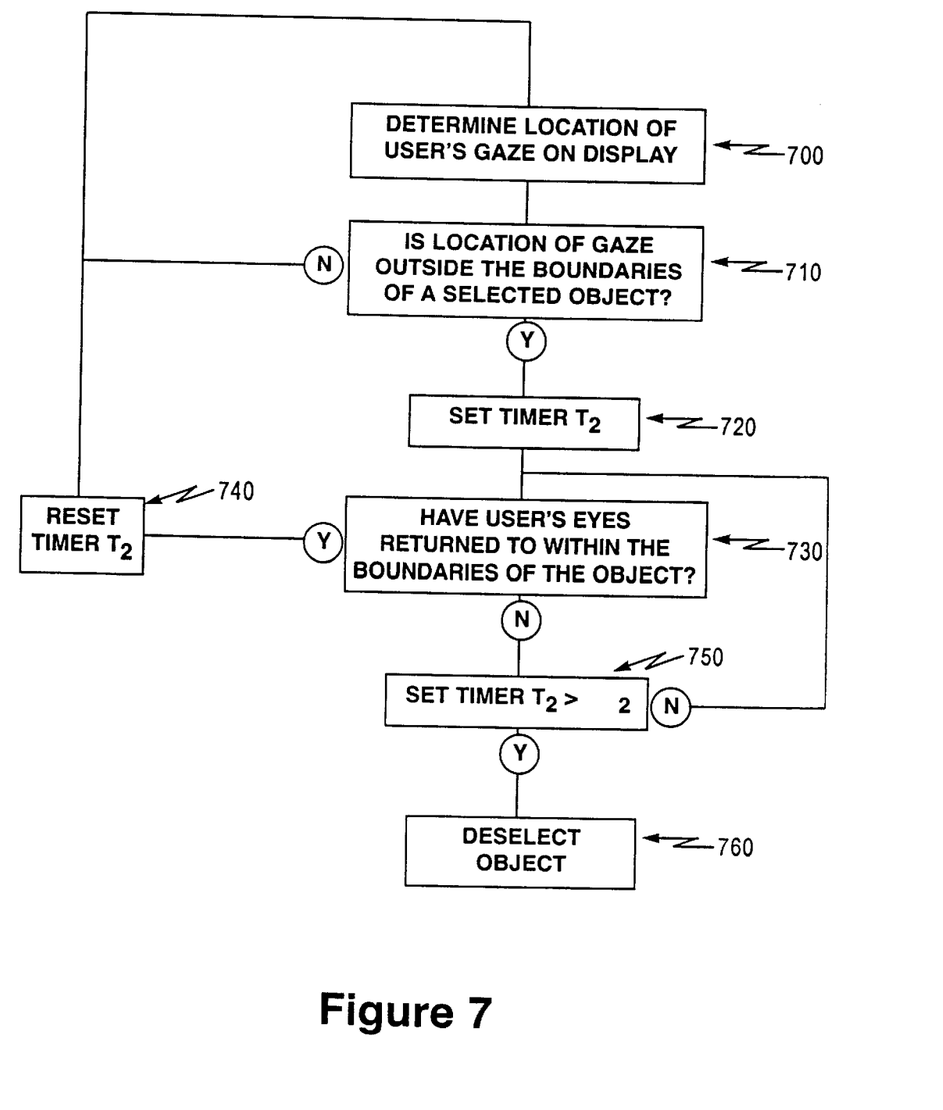
FIG. 7 is a flow chart of a deselect object process.

FIG. 7 is a flow chart of a deselect object process. Once an object has been selected, it becomes necessary to determine whether or not that object remains the focus of the user's attention. The process shown in FIG. 7 permits that determination and deselects the object when it is no longer the focus of the user's attention. As before, the eyetracker determines the location of the user's gaze on the display (700) and determines whether the location of the gaze has gone outside the boundaries of a selected object (710). If it has, timer T2 is set and a check is made to see if the user's eyes have returned to within the boundaries of the object (730). If they have, the timer T2 is reset and the process begins with block 700 again. If the user's eyes have not returned to within the boundaries of the selected object (730-N), timer T2 is checked to see if it is greater than $T_2$. If $T_2$ has not been exceeded by timer T2, the monitoring of the user's eyes continue to see if they have returned within the boundaries of the object. If the timer T2 exceeds $T_2$ (750-Y), the user's attention has left the object and the object is deselected (760).

Figure 8:
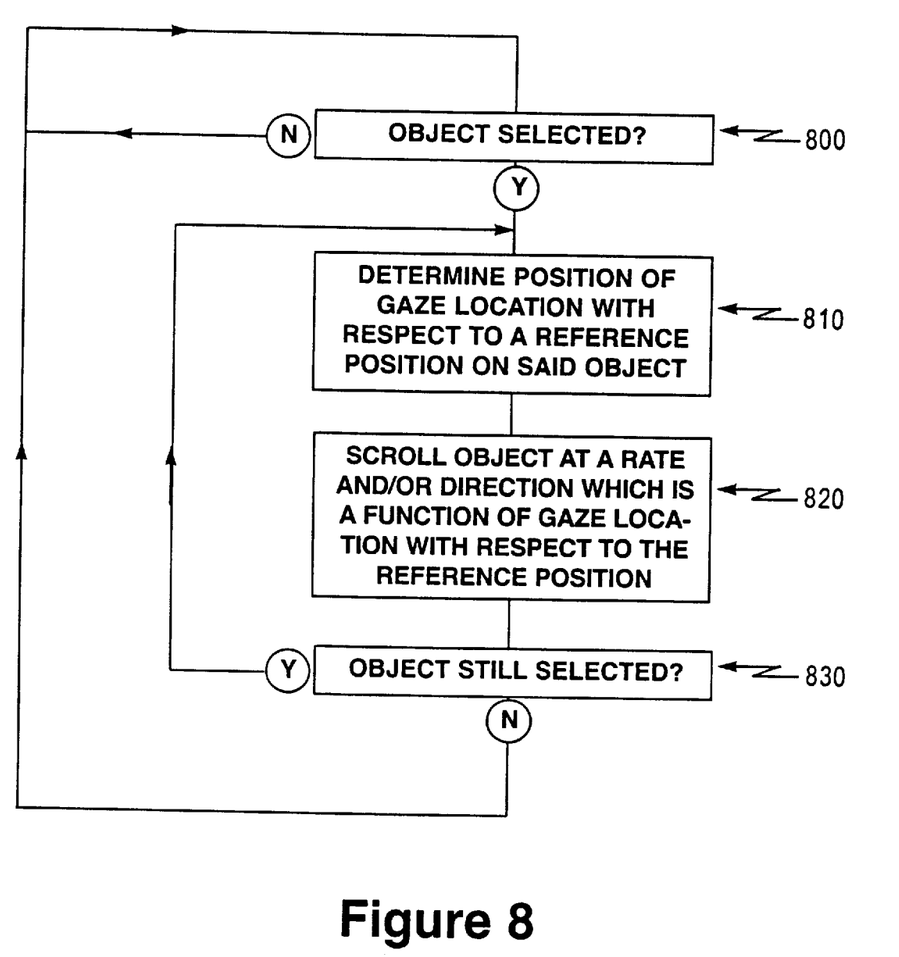
FIG. 8 is a flow chart of eyetracker control of scrolling of a selected object.

FIG. 8 is a flow chart of eyetracker control of scrolling of a selected object. Once an object is selected (800), determination is made of the position of the gaze location with respect to a reference position on said object (810). The rate of scrolling of the text object is determined as a function of gaze location with respect to the reference position (820) as discussed in conjunction with FIG. 3. This permits the scrolling of the object to keep unread text within the viewport available to the user at all times. Once an adjustment in rate has been undertaken, a check is made to make sure the object is still selected (830). If it is, monitoring of the user's eye position and adjustment of the scrolling rate continues on an ongoing basis. If the object has not been selected, the process returns to the beginning. This allows a variable rate scroll to be implemented based on the location of the user's eyes within the viewing window.

Figure 9:
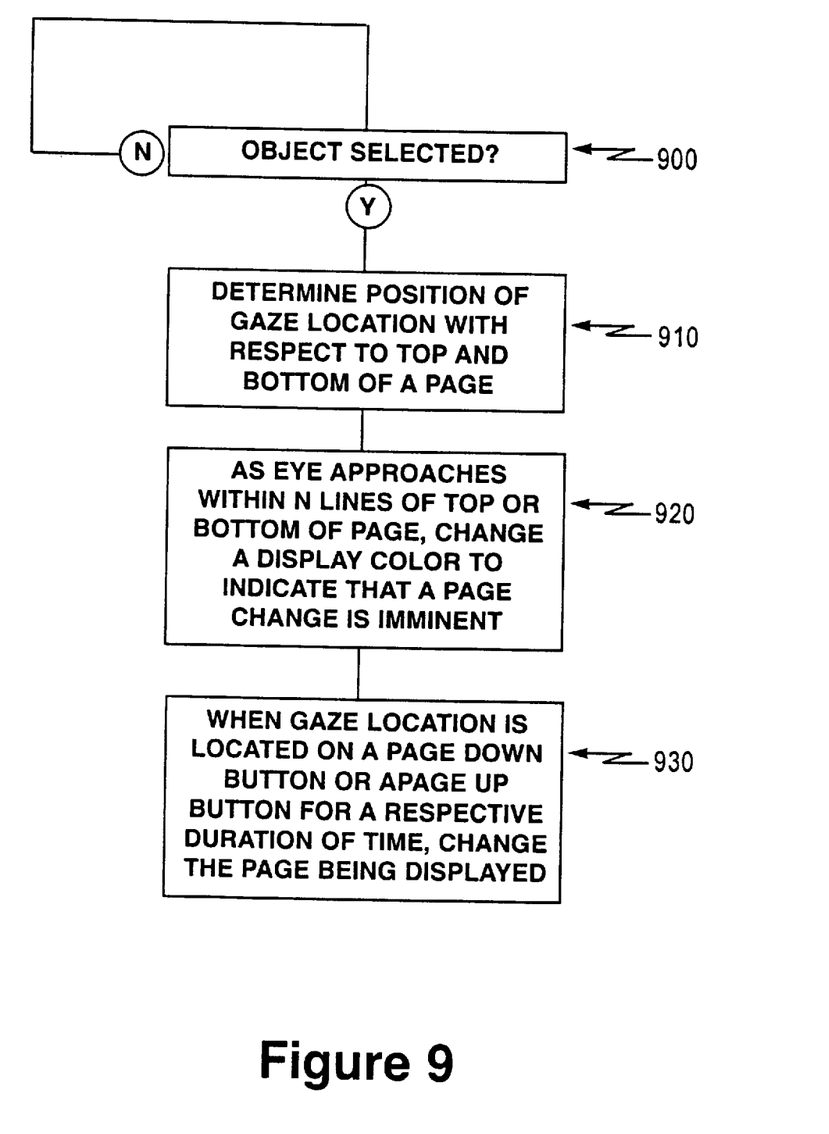
FIG. 9 is a flow chart of eyetracker control of pagination.

FIG. 9 is a flow chart of eyetracker control of pagination. If an object has been selected as the focus of user attention (900), the position of a user's gaze is determined with respect to the top and bottom of a page (910). As the user's eyes approach within N lines of the top or bottom of the page, a change in display color will occur to indicate that a page change boundary is being approached and that a page change may be imminent (920). When a user's gaze location is located on a page down area or button or a page up area or button for a respective duration of time, a new page of text will be displayed. That is, a page up or a page down function will be executed.

As an option, it may be desirable to include a duplicate line of text from the bottom of a page to the top of the next page as a way of ensuring continuity of thought process during the distraction caused by a change of page.

Figure 10:
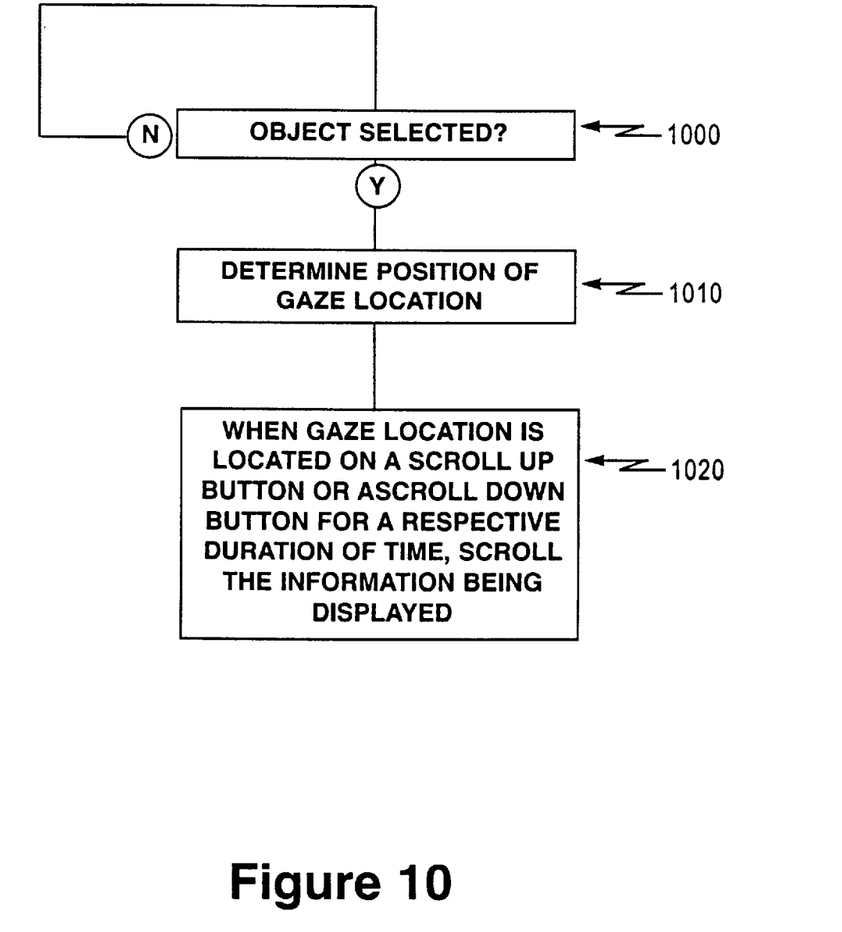
FIG. 10 is a flow chart of eyetracker control of scrolling using eye activated scroll objects.

FIG. 10 is a flow chart of eyetracker control of scrolling using eye activated scroll objects.

As before, when an object is selected, the position of a user's gaze is determined (1010). When gaze location is located on a scroll up area or a scroll down area, for a respective duration of time, the information being displayed is scrolled in the direction indicated by the up or down scroll areas (1020).

In the manner shown, the action of a user's eyes in the normal reading process can be utilized to control both scrolling rate, scrolling direction, page change in ways which eliminate the awkwardness and distraction and other problems associated with prior art scrolling techniques.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. Apparatus for controlling information on a display, comprising:
    a. a computer;
    b. a display connected to said computer;
    c. an eyetracker connected to said computer for detecting a location on said display at which a user's eyes are looking; and
    d. a controller to change information content on said display as a function of said location in which said information content on said display is changed by scrolling at a rate which is a function of a relationship between said location and a reference position.

2. Apparatus of claim 1 in which said function is a linear function.

3. Apparatus of claim 1 in which said function is an exponential function.

4. Apparatus of claim 1 in which said function is a discontinuous function.

5. Apparatus of claim 4 in which transitions between regions of said discontinuous function are smoothed so that changes in rate of scrolling occur without substantial distraction to the user.

6. Apparatus for controlling information on a display, comprising:
    a. a computer;
    b. a display connected to said computer;
    c. an eyetracker connected to said computer for detecting a location on said display at which a user's eyes are looking; and
    d. a controller to change information content on said display as a function of said location in which said information content on said display is changed by paging in response to a user's gaze.

7. Apparatus of claim 6 in which paging is initiated by a user looking at a particular area of the screen for a particular duration.

8. Apparatus of claim 6 in which scrolling within a page is accomplished by looking at an area of the screen for a particular duration.

9. Apparatus of claim 6 in which changing the information content on said display is initiated by looking at an icon for a predetermined duration.

10. A method for controlling information on a display of a computer having an eyetracker, comprising the steps of:
    a. providing an element for performing the step of identifying a location on said display to which a user's eyes are directed, and b. providing an element for performing the step of scrolling information content on said display as a function of said location.

11. A method for controlling information on a display of a computer having an eyetracker, comprising the steps of:
   a. providing an element for performing the step of identifying a location on said display to which a user's eyes are directed,
   b. providing an element for performing the step of selecting a text object based on said location, and
   providing an element for performing the step of scrolling information content displayed in said text object as a function of said location.

12. A method for controlling information on a display of a computer having an eyetracker comprising the steps of:
   a. providing an element for performing the step of identifying a location on said display to which a user's eyes are directed,
   b. providing an element for performing the step of selecting a text object based on said location, and
   providing an element for performing the step of deselecting said text object when a user's eyes leave said text object for a certain amount of time.

13. A method for controlling information on a display of a computer having an eyetracker, comprising the steps of:
   a. providing an element for performing the step of identifying a location on said display to which a user's eyes are directed, and
   b. providing an element for performing the step of changing a display color as the user's eye's approach a page boundary.

14. A system for displaying information, comprising:
   a. a network; and
   b. a plurality of computers connected to said network, at least one of said computers having an eyetracker and configured for detecting a location on a display at which a user's eyes are looking and for scrolling information content on said display as a function of said location.

15. A computer program product for controlling information on a display of a computer having an eyetracker, comprising:
   a. a memory medium; and
   b. a computer program stored on said memory medium, said computer program containing instructions for identifying a location on said display to which a user's eyes are directed, and for scrolling information content on said display as a function of said location.

16. A computer program product for controlling information on a display of a computer having an eyetracker, comprising:
   a. a memory medium; and
   b. a computer program stored on said memory medium, said computer program containing instructions for identifying a location on said display to which a user's eyes are directed, and
   for changing a display color as the user's eye's approach a page boundary.

* * * * *